United States Patent
Karasawa et al.

(10) Patent No.: US 8,521,374 B2
(45) Date of Patent: Aug. 27, 2013

(54) HYDRAULIC WORK MACHINE

(75) Inventors: Hideo Karasawa, Tsuchiura (JP);
Nobuei Ariga, Tsuchiura (JP); Tsuyoshi Nakamura, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/575,462

(22) PCT Filed: Jan. 27, 2011

(86) PCT No.: PCT/JP2011/051595
§ 371 (c)(1),
(2), (4) Date: Jul. 26, 2012

(87) PCT Pub. No.: WO2011/093378
PCT Pub. Date: Aug. 4, 2011

(65) Prior Publication Data
US 2012/0310492 A1  Dec. 6, 2012

(30) Foreign Application Priority Data

Jan. 28, 2010 (JP) ................................. 2010-017065

(51) Int. Cl.
*G06F 7/70* (2006.01)
(52) U.S. Cl.
USPC ......................................................... 701/50
(58) Field of Classification Search
USPC ......................................................... 701/50
See application file for complete search history.

(56) References Cited

U.S. PATENT DOCUMENTS

2009/0248259 A1  10/2009  Lee
2010/0009806 A1*  1/2010  Shirao et al. .................... 477/52

FOREIGN PATENT DOCUMENTS

| JP | 3-168339 A | 7/1991 |
| JP | 9-125464 A | 5/1997 |
| JP | 2006-292104 A | 10/2006 |
| JP | 2009-235893 A | 10/2009 |

OTHER PUBLICATIONS

International Search Report dated Apr. 19, 2011 with English translation (two (2) pages).

* cited by examiner

*Primary Examiner* — James Trammell
*Assistant Examiner* — Michael D Lang
(74) *Attorney, Agent, or Firm* — Crowell & Moring LLP

(57) ABSTRACT

A hydraulic working machine, typically a hydraulic excavator has a travel speed control unit and a boost control unit. The travel speed control unit includes a traveling, hydraulic pressure oil feed unit capable of feeding pressure oil to actuate traveling tilt-angle control devices. The boost control unit includes a boosting, hydraulic pressure oil feed unit capable of feeding pressure oil to actuate an adjustable relief valve. A single hydraulic pressure oil feed unit is commonly usable as the traveling, hydraulic pressure oil feed unit and the boosting, hydraulic pressure oil feed unit, and includes lines communicating with both of the traveling tilt-angle control devices and the adjustable relief valve, a solenoid valve for opening or closing these lines, and a controller for outputting a control signal to control the solenoid valve.

5 Claims, 5 Drawing Sheets

HYDRAULIC WORK MACHINE

TECHNICAL FIELD

This invention relates to a hydraulic working machine, such as a hydraulic excavator, which is provided with a traveling tilt-angle control device for controlling a tilt angle of a variable displacement hydraulic motor as a travel motor and also with a travel speed selector part operably arranged to output, to the traveling tilt-angle control device, a signal to select a low speed or high speed as a revolution speed of the travel motor.

BACKGROUND ART

As a conventional technology of this sort, there is one disclosed in JP-A-3-168339. In this conventional technology, a construction machine such as a hydraulic excavator is constructed with a traveling tilt-angle control device for controlling the tilt angle of a variable displacement travel motor, specifically a tilt-angle adjusting cylinder, a travel speed selector part, and a traveling, hydraulic pressure oil feed part. The travel speed selector part is comprised of a switch for selecting, as the revolution speed of the travel motor, either a first speed, in other words, a low speed or a second speed, in other words, a high speed. The traveling, hydraulic pressure oil feed part includes a switching solenoid valve, which is driven and controlled by a signal outputted responsive to a switching manipulation of the switch and can feed pressure oil to actuate the tilt-angle adjusting cylinder.

According to the conventional technology constructed as described above, while the switch is not in manipulated, the switching solenoid valve maintains closed a line, in other words, an oil passage that communicates a pilot pump and the tilt-angle adjusting cylinder with each other. Accordingly, pilot pressure oil from the pilot pump is not fed to the tilt-angle adjusting cylinder so that the tilt angle is maintained large and the revolution speed of the travel motor is maintained at the first speed, that is, at the low speed. When the switch is manipulated, the switching solenoid valve is actuated to open the oil passage. As a consequence, the pilot pressure oil from the pilot pump is fed to the tilt-angle adjusting cylinder, the tilt angle is decreased, and the revolution speed of the travel motor is changed to the second speed, that is, to the high speed.

As another conventional technology, there is one disclosed in JP-A-2006-292104. In this another conventional technology, a construction machine such as a hydraulic excavator is also constructed with a travel speed control unit, which is comprised of a traveling tilt-angle control device, a travel speed selector part, and a traveling, hydraulic pressure oil feed part. The traveling tilt-angle control device is comprised of a two-speed selector cylinder for controlling the tilt angle of a variable displacement travel motor. The travel speed selector part is comprised of a two-speed pedal for selecting either a first speed or a second speed as the revolution speed of the travel motor. The traveling, hydraulic pressure oil feed part includes a two-speed selector valve, which is driven and controlled by a signal outputted responsive to a manipulation of the two-speed pedal and can feed pressure oil to actuate the above-mentioned two-speed selector cylinder.

The latter conventional technology can change a preset relief pressure, and is provided with a relief pressure control part which can selectively maintain a maximum pressure of a delivery pressure of a main pump at a normal-time relief pressure or at a boost-time relief pressure which is a pressure higher than the normal-time relief pressure. This relief pressure control part is comprised of a main relief valve and a boost cylinder for actuating the main relief valve. Also provided is a boost-pressure switching selector part operably arranged to output a signal that can actuate the boost cylinder to change the preset relief pressure from the normal-time relief pressure to the boost-time relief pressure. This boost-pressure switching selector part is comprised of a detection circuit for detecting that the above-mentioned two-speed selector valve, which is included in the travel speed control unit, has been switched to a second-speed position. Further provided is a boosting, hydraulic pressure oil feed part including a boost valve that is driven and controlled by a signal outputted from the detection circuit and can feed pressure oil to actuate the above-mentioned boost cylinder. By the above-mentioned relief pressure control part, boost-pressure switching selector part and boosting, hydraulic pressure oil feed part, a boost control unit is constructed. It is configured such that, when the two-speed selector valve is switched to the second-speed position, the boost valve is actuated to change the preset relief pressure of the main relief valve from the normal-time relief pressure to the boost-time relief pressure, thereby making it possible to obtain a travel pressure higher than before.

DISCLOSURE OF THE INVENTION

Problem to be Solved by the Invention

As in the above-mentioned latter conventional technology disclosed in JP-A-2006-292104, a travel speed control unit, which is comprised of a traveling tilt-angle control device, a travel speed selector part and a traveling, hydraulic pressure oil feed part, and a boost control unit, which is comprised of a relief pressure control part, a boost-pressure switching selector part and a boosting, hydraulic pressure oil feed part, have heretofore been constructed to be partially independent from each other in structure. Described specifically, the above-described conventional construction requires, in addition to a two-speed selector valve or solenoid valve included in the traveling, hydraulic pressure oil feed part of the travel speed control unit, a boost valve to be included, independently from the two-speed selector valve or solenoid valve, in the boosting, hydraulic pressure oil feed part of the boost control unit. Therefore, the above-described conventional construction tends to require a greater number of components, and hence, a greater space for the layout of these travel speed control unit and boost control unit. In the case of a hydraulic working machine such as, for example, a small hydraulic excavator which does not have enough layout space for the components relevant to the travel speed control unit and boost control unit and is prone to limitations on their layout space, it has thus been difficult to design the layout of the components relevant to the travel speed control unit and boost control unit. Another problem has also arisen that higher manufacturing cost is needed because of the greater number of components relevant to the travel speed control unit and boost control unit.

With the above-mentioned situation of the conventional technology in view, the present invention has as an object thereof the provision of a hydraulic working machine, which has a travel speed control unit and a boost control unit and makes it possible to reduce the number of components relevant to these travel speed control unit and boost control unit.

Means for Solving the Problem

To achieve the above-mentioned object, a hydraulic working machine according to the present invention is constructed as will be described next.

The hydraulic working machine according to the present invention is characterized in that in a hydraulic working machine provided with a hydraulic pump as a main pump, a variable displacement hydraulic motor actuated as a travel motor by pressure oil delivered from the main pump to allow a travel base to travel, a traveling directional control valve for controlling a flow of pressure oil to be fed from the main pump to the travel motor, a traveling control device for switchingly controlling the traveling directional control valve, a travel speed control unit for controlling a tilt angle of the travel motor in such a state that the travel motor revolves at one of two speeds consisting of a low speed and a high speed, and a boost control unit for controlling a maximum delivery pressure of the main pump, said travel speed control unit being provided with a hydraulically-actuated, traveling tilt-angle control device for controlling the tilt angle of the travel motor, a travel speed selector part operably arranged to instruct selection of one of the low speed and high speed, and a traveling, hydraulic pressure oil feed part operably arranged to control hydraulic pressure oil, which is to be fed to the traveling tilt-angle control device, based on an instruction from the travel speed selector part, and said boost control unit being provided with a hydraulically-actuated, relief pressure control part operably arranged to control a preset relief pressure at which the maximum delivery pressure of the main pump is to be regulated, a boost-pressure switching selector part operably arranged to instruct to select, as the preset relief pressure of the relief pressure control part, one of a normal-time relief pressure and a boost-time relief pressure which is a pressure higher than the normal-time relief pressure, and a boosting, hydraulic pressure oil feed part operably arranged to control hydraulic pressure oil, which is to be fed to the relief pressure control part, based on an instruction from the boost-pressure switching selector part, the hydraulic working machine is provided with only a single hydraulic pressure oil feed part commonly usable as the traveling, hydraulic pressure oil feed part of the travel speed control unit and also as the boosting, hydraulic pressure oil feed part of the boost control unit.

In the hydraulic working machine described above, when the selection of the low speed is instructed by the travel speed selector part of the travel speed control unit and the traveling control device is manipulated, the hydraulic pressure oil feed part feeds no hydraulic pressure oil to the traveling tilt-angle control device. Described specifically, the traveling tilt-angle control device controls the tilt angle of the travel motor at a large tilt angle commensurate with the low speed, and the travel motor is brought into a state that it revolves at the low speed. During this time, the hydraulic pressure oil feed part feeds no hydraulic pressure oil to the relief-pressure control part either, so that the relief pressure control part of the boost control unit controls the preset relief pressure at the normal-time relief pressure.

When the selection of the high speed is instructed by the travel speed selector part of the travel speed control unit and the traveling control device is manipulated, the hydraulic pressure oil feed part is actuated, hydraulic pressure oil is fed from the hydraulic pressure oil feed part to the traveling tilt-angle control device, and therefore, the traveling tilt-angle control device is actuated. Described specifically, the traveling tilt-angle control device controls the tilt angle of the travel motor to a small tilt angle commensurate with the high speed, and the travel motor is brought into a state that it revolves at the high speed. During this time, the hydraulic pressure oil is also fed from the hydraulic pressure oil feed part to the relief-pressure control part, so that the preset relief pressure of the relief pressure control part is controlled to the boost-time relief pressure.

In a state that the traveling control device has been manipulated, no hydraulic pressure oil is fed either from the hydraulic pressure oil feed part to the relief pressure control part when the selection of the normal-time relief pressure is instructed as the preset relief pressure by the boost-pressure switching selector part of the boost control unit. As a consequence, the preset relief pressure of the relief pressure control part is controlled at the normal-time relief pressure.

When the selection of the boost-time relief pressure is instructed as the preset relief pressure by the boost-pressure switching selector part of the boost control unit in a state that the traveling control device has not been manipulated likewise, hydraulic pressure oil is fed from the hydraulic pressure oil feed part to the relief pressure control part. As a consequence, the preset relief pressure of the relief pressure control part is controlled to the boost-time relief pressure.

As the hydraulic working machine according to the present invention is provided with only the single hydraulic pressure oil feed part commonly usable as the traveling, hydraulic pressure oil feed part of the travel speed control unit and also as the boosting, hydraulic pressure oil feed part of the boost control unit as mentioned above, the number of components relevant to the traveling and boosting, hydraulic pressure oil feed part, in other words, the number of components relevant to the travel speed control unit and boost control unit can be reduced. As a consequence, the layout space relevant to the travel speed control unit and boost control unit can be reduced.

The hydraulic working machine according to the present invention is characterized in that in the hydraulic working machine described above, the relief pressure control part of the boost control unit comprises an adjustable relief valve. The hydraulic working machine described here is provided as the relief pressure control part with the adjustable relief valve which is readily available, and therefore, is high in practical utility.

The hydraulic working machine according to the present invention is characterized in that in the hydraulic working machine described above, the single hydraulic pressure oil feed part is provided with a line communicating with both of the traveling tilt-angle control device of the travel speed control unit and the adjustable relief valve of the boost control unit, a solenoid valve for opening or closing the line, a pilot pump for delivering, into the line, pilot pressure oil as the hydraulic pressure oils that are to drive the traveling, tilt-angle control device and adjustable relief valve, and a controller for controlling the solenoid valve, and the controller controls the solenoid valve such that responsive to an instruction from the travel speed selector part of the travel speed control unit, the travel motor is brought into a state of revolution at the low speed or a state of revolution at the high speed, or such that responsive to an instruction from the boost-pressure switching selector part of the boost control unit, the preset relief pressure of the adjustable relief valve is set at the normal-time relief pressure or boost-time relief pressure.

In the hydraulic working machine described above, when setting is made, for example, such that by the feeding of a pilot pressure, the tilt angle of the travel motor is controlled to the small tilt angle by the traveling tilt-angle control device and the adjustable relief valve is controlled to the boost-time relief pressure, and by the feeding of no pilot pressure, the tilt angle of the travel motor is controlled to the large tilt angle and the adjustable relief valve is controlled to the normal-time relief pressure, an instruction of the selection of the low speed by the travel speed selector part causes the controller to control the valve position of the solenoid valve to the closed position so that the line, which is in communication with both of the traveling tilt-angle control device and the adjustable relief valve, and the pilot pump are cut off from each other by the solenoid valve. As a consequence, no pilot pressure is fed from the pilot pump to the traveling tilt-angle control device, the traveling tilt-angle control device controls the tilt angle of the travel motor at the large tilt angle, and the travel motor is brought into a state that it revolves at the low speed. During this time, no pilot pressure oil is fed from the pilot pump to the adjustable relief valve either so that the preset relief pressure of the adjustable relief valve is control led at the normal-time relief pressure.

When the selection of the high speed is instructed by the travel speed selector part, on the other hand, the controller controls the valve position of the solenoid valve to the open position. As a consequence, the line, which is in communication with both of the traveling tilt-angle control device and the adjustable relief valve, and the pilot pump are communicated with each other via the solenoid valve. Therefore, a pilot pressure is applied from the pilot pump to the traveling tilt-angle control device, the traveling tilt-angle control device controls the tilt angle of the travel motor to the small tilt angle, and hence, the travel motor is brought into a state that it revolves at the high speed. During this time, the pilot pressure is also applied from the pilot pump to the adjustable relief valve so that the preset relief pressure of the adjustable relief valve is controlled to the boost-time relief pressure.

When the selection of the normal-time relief pressure is instructed as the preset relief pressure by the boost-pressure switching selector part of the boost control unit, the controller controls the valve position of the solenoid valve to the closed position. As a consequence, both of the traveling tilt-angle control device and the adjustable relief valve and the pilot pump are cut off from each other by the solenoid valve. Therefore, no pilot pressure is fed from the pilot pump to the adjustable relief valve so that the preset relief pressure of the adjustable relief valve is controlled at the normal-time relief pressure.

When the selection of the boost-time relief pressure is instructed as the preset relief pressure by the boost-pressure switching selector part, the controller controls the valve position of the solenoid valve to the open position. As a consequence, both of the traveling tilt-angle control device and the adjustable relief valve and the pilot pump are communicated with each other via the solenoid valve. Therefore, a pilot pressure is fed from the pilot pump to the adjustable relief valve so that the preset relief pressure of the adjustable relief valve is controlled to the boost-time relief pressure.

The hydraulic working machine according to the present invention is characterized in that in the hydraulic working machine described above, the travel speed selector part is provided with a two-travel-speed selector switch electrically connected to the controller for instructing selection of one of the low speed and high speed as a revolution speed of the travel motor, a travel control performance detection part operably arranged to detect a manipulation of the traveling control device, and a delivery pressure detection part operably arranged to detect that a delivery pressure of the main pump has reached the preset pressure set beforehand, the boost-pressure switching selector part is provided with a boost pressure selector switch electrically connected to the controller for instructing selection of one of the normal-time relief pressure and boost-time relief pressure as the preset relief pressure of the adjustable relief valve, a travel control non-performance detection part operably arranged to detect a non-manipulation of the traveling control device, and a delivery pressure detection part operably arranged to detect that the delivery pressure of the main pump has reached the preset pressure set beforehand, the travel control performance detection part of the travel speed selector part and the travel control non-performance detection part of the boost-pressure switching selector part are provided with a travel-control detecting pressure sensor for outputting a travel detection signal in association with a manipulation of the traveling control device, and also with a travel control determination part arranged in the controller for determining, based on the travel detection signal, whether or not the traveling control device has been manipulated, the delivery pressure detection part of the travel speed selector part and the delivery pressure detection part of the boost-pressure switching selector part are provided with a delivery-pressure detecting pressure sensor for outputting a delivery pressure detection signal commensurate with the delivery pressure of the main pump, and also with a boost determination part arranged in the controller for determining, based on the delivery pressure detection signal, whether or not the delivery pressure of the main pump has reached the preset pressure, and when the delivery pressure of the main pump is determined by the boost determination part to have reached the preset pressure in a state that the tilt angle of the travel motor has been controlled to a small tilt angle commensurate with the high speed and the traveling control device is determined by the travel control determination part to be in a manipulated state, the controller controls the solenoid valve such that the tilt angle of the travel motor becomes a large tilt angle commensurate with the low speed, and when the delivery pressure of the main pump is determined by the boost determination part to have reached the preset pressure in a state that the preset relief pressure has been controlled at the normal-time relief pressure and the traveling control device is determined by the travel control determination part not to be in the manipulated state, the controller controls the solenoid valve such that the preset relief pressure increases to the boost-time relief pressure.

In the hydraulic working machine described above, when with the selection of the low speed having been instructed by the two-travel-speed selector switch of the travel speed selector part, the travel control determination part of the controller determines, based on a travel detection signal from the travel-control detecting pressure sensor, that the traveling control device is in a manipulated state, the controller controls the valve position of the solenoid valve to the open position based on the result of the determination and an instruction (low speed) from the two-travel-speed selector switch. As a consequence, the line, which is in communication with both of the traveling tilt-angle control device and the adjustable relief valve, and the pilot pump are cut off from each other by the solenoid valve. Therefore, no pilot pressure oil is fed from the pilot pump to the traveling tilt-angle control device, the traveling tilt-angle control device controls the tilt angle of the travel motor at the large tilt angle, and the travel motor is brought into a state that it revolves at the low speed. During this time, no pilot pressure is applied from the pilot pump to the adjustable relief valve either so that the preset relief pressure of the adjustable relief valve is controlled at the normal-time relief pressure.

When with the selection of the high speed having been instructed by the two-travel-speed selector switch, the travel control determination part of the controller determines, based on a travel detection signal from the travel-control detecting pressure sensor, that the traveling control device is in a manipulated state, the controller controls the valve position of the solenoid valve to the open position based on the result of the determination and an instruction (high speed) from the two-travel-speed selector switch. As a consequence, the line, which is in communication with both of the traveling tilt-angle control device and the adjustable relief valve, and the pilot pump are communicated with each other via the solenoid valve. Therefore, a pressure oil is fed from the pilot pump to the traveling tilt-angle control device, the traveling tilt-angle control device controls the tilt angle of the travel motor to the small tilt angle, and the travel motor is brought into a state that it revolves at the high speed. During this time, the pilot pressure oil from the pilot pump is also fed to the adjustable relief valve so that the preset relief pressure of the adjustable relief valve is controlled to the boost-time relief pressure.

In a state that the travel motor has been controlled in a state that it is revolves at the high speed, the travel control determination part of the controller determines, based on a travel detection signal from the travel-control detecting pressure sensor, that the traveling control device is in a manipulated state. When the hydraulic working machine initiates, for example, a climbing travel in this state and the delivery pressure of the main pump reaches, for example, a preset pressure set substantially equal to or slightly lower than the normal-time relief pressure, the boost determination part of the controller determines, based on a delivery pressure detection signal from the delivery-pressure detecting pressure sensor, that the delivery pressure of the main pump has reached the preset value. Based on the result of determination that the traveling control device is in the manipulated state and the result of determination that the delivery pressure of the main pump has reached the preset pressure, the controller then controls the valve position of the solenoid valve from the open position to the closed position. As a consequence, the line, which is in communication with the traveling tilt-angle control device, and the pilot pump is cut off from each other by the solenoid valve. Therefore, the pilot pressure becomes no longer applied from the pilot pump to the traveling tilt-angle control device, the traveling tilt-angle control device controls the tilt angle of the travel motor to the large tilt angle, and hence, the travel motor is changed to a state that it revolves at the low speed. In other words, even in the state that the travel base is traveling at the high speed, the travel speed is forcedly reduced to the low speed when the delivery pressure of the main pump has reached the preset pressure. As a consequence, excellent safety can be assured upon traveling of the hydraulic working machine.

Based on the output of no travel detection signal from the travel-control detecting pressure sensor in a state that the traveling control device has not been manipulated, the travel control determination part of the controller determines that the traveling control device is in a non-manipulated state. When the selection of the normal-time relief pressure is instructed in this state by the boost pressure selector switch of the boost-pressure switching selector part, the controller controls the valve position of the solenoid valve to the closed position based on the result of determination that the traveling control device is in the non-manipulated state and also based on an instruction (low speed) from the boost pressure selector switch. As a consequence, both of the traveling tilt-angle control device and the adjustable relief valve and the pilot pump are cut off from each other by the solenoid valve. Therefore, no pilot pressure is applied from the pilot pump to the adjustable relief valve, so that the preset relief pressure of the adjustable relief valve is controlled at the normal-time relief pressure.

When the selection of the boost-time relief pressure is instructed by the boost pressure selector switch in a state that the traveling control device has not been manipulated either, the controller controls the valve position of the solenoid valve to the open position. As a consequence, both of the traveling tilt-angle control device and the adjustable relief valve and the pilot pump are communicated with each other via the solenoid valve. Therefore, a pilot pressure is applied from the pilot pump to the adjustable relief valve, so that the preset relief pressure of the adjustable relief valve is controlled from the normal-time relief pressure to the boost-time relief pressure.

When the hydraulic working machine performs, for example, work by operating its working equipment and the load on the main pump increases accordingly, the delivery pressure of the main pump may reach the preset pressure. In this case, the boost determination part of the controller determines, based on a delivery pressure detection signal from the delivery-pressure detecting pressure sensor, that the delivery pressure of the main pump has reached the preset value. When the preset relief pressure of the adjustable relief valve is at this time in a state that it is controlled at the normal-time relief pressure, the controller switches the valve position of the solenoid valve from the closed position to the open position based on the result of determination that the traveling control device is in a non-manipulated state and also based on the result of determination that the delivery pressure of the main pump has reached the preset pressure. As a consequence, the adjustable relief valve and the pilot pump are communicated with each other via the solenoid valve. Therefore, a pilot pressure is applied from the pilot pressure to the adjustable relief valve, so that the preset relief pressure of the adjustable relief valve increases from the normal-time relief pressure to the boost-time relief pressure. In other words, even in a state that the maximum delivery pressure (preset relief pressure) of the main pump has been controlled at the normal-time relief pressure, the controller forcedly increases the maximum delivery pressure of the main pump to the boost-time relief pressure when the delivery pressure of the main pump has reached the preset value. As a consequence, excellent workability can be assured upon working by the hydraulic working machine.

The control, which forcedly increases the preset relief pressure from the normal-time relief pressure to the boost-time relief pressure as described above, may desirably be set to be performed in a specific operation in which like a boom raising operation, arm crowding operation or the like by the hydraulic working machine, the delivery pressure of the main pump is expected to reach the normal-time relief pressure.

The hydraulic working machine according to the present invention is characterized in that in the hydraulic working machine described above, the solenoid valve comprises a proportional solenoid valve, and based on a result of determination by the travel control determination part that the traveling control device is in the manipulated state under a state that the selection of the high speed has been instructed by the two-travel-speed selector switch and a result of determination by the boost determination part that the delivery pressure of the main pump has not reached the predetermined pressure, the controller controls the proportional solenoid valve such that the tilt angle of the travel motor is controlled to the small tilt angle commensurate with the high speed and the preset relief pressure is controlled to the normal-time relief pressure.

When the delivery pressure of the main pump has not reached the preset pressure in a state that the high speed has been selected by the two-travel-speed selector switch 33 and a high-speed travel is being performed, the hydraulic working machine described above can control the maximum delivery pressure of the main pump at the normal-time relief pressure while maintaining the tilt angle of the travel motor at the small tilt angle commensurate with the high speed. As a consequence, improved safety can be assured upon performing a high-speed travel.

Advantageous Effects of the Invention

The hydraulic working machine according to the present invention is provided with only the single hydraulic pressure oil feed part commonly usable as the traveling, hydraulic pressure oil feed part, which can feed pressure oil to actuate the traveling tilt-angle control device of the travel speed control unit, and also as the boosting, hydraulic pressure oil feed part, which can feed pressure oil to actuate the relief pressure control part of the boost control unit. In one having such travel speed control unit and boost control unit, the number of components relevant to these travel speed control unit and boost control unit can, therefore, be reduced. As a consequence, the layout space for the components relevant to the travel speed control unit and boost control unit can be reduced. Even in a hydraulic working machine such as, for example, a small hydraulic excavator which does not have enough layout space for the components relevant to the travel speed control unit and boost control unit and is prone to limitations on their layout space, it is facilitated to design the layout of the components relevant to the travel speed control unit and boost control unit although their layout design has heretofore been difficult. In addition, the manufacturing cost can be lowered compared with before because the number of the components relevant to the travel speed control unit and boost control unit becomes smaller than before.

MODES FOR CARRYING OUT THE INVENTION

A description will hereinafter be made about embodiments of the hydraulic working machine according to the present invention.

First Embodiment

A hydraulic working machine according to a first embodiment of the present invention will be described with reference to FIG. 1 and FIG. 2.

Figure 1:
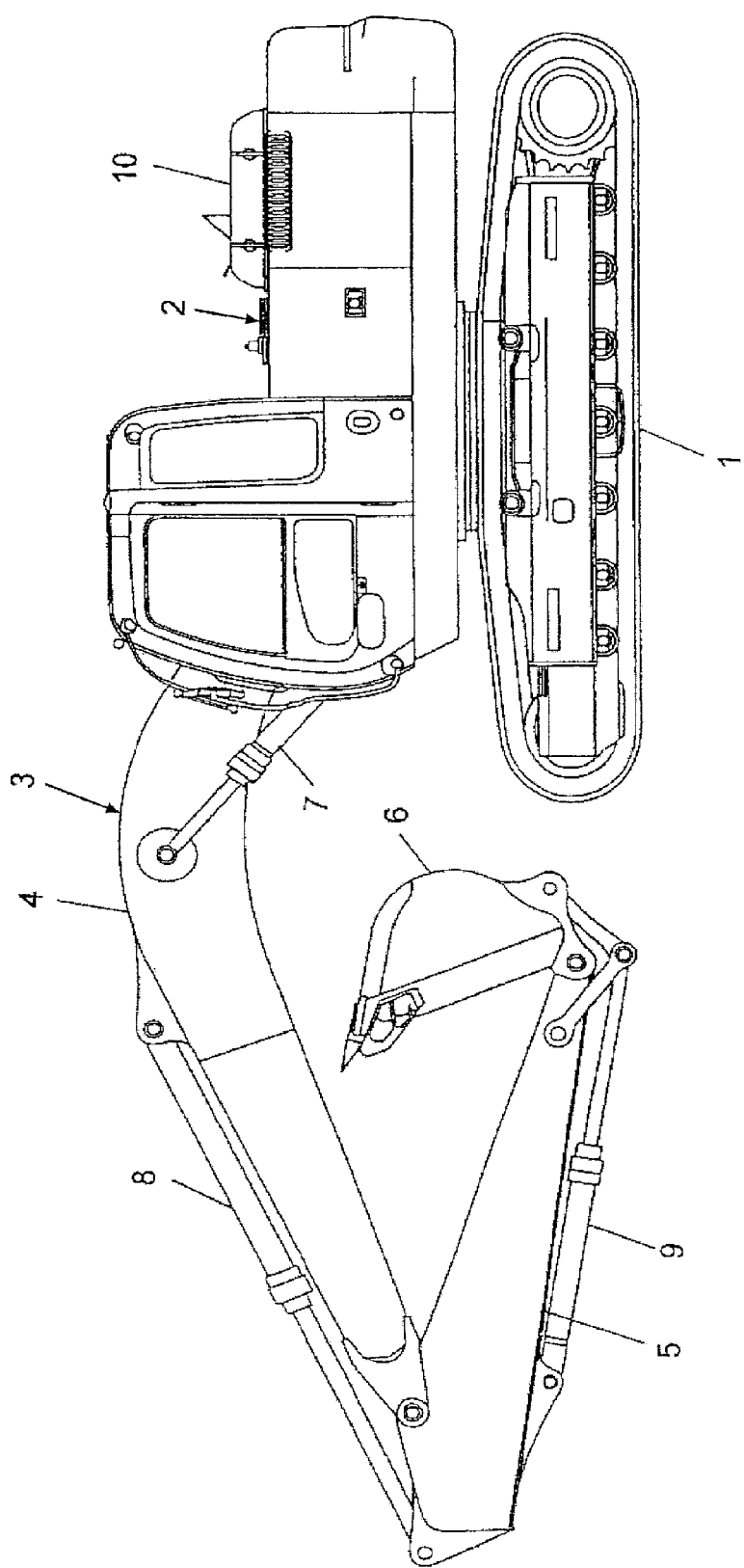
FIG. 1 is a side view showing a hydraulic excavator as a hydraulic working machine according to a first embodiment of the present invention.

FIG. 1 is a side view showing a hydraulic excavator as a hydraulic working machine according to a first embodiment of the present invention. As shown in FIG. 1, the hydraulic working machine according to the first embodiment is, for example, a hydraulic excavator, which is provided with a travel base 1, a revolving upperstructure 2 swingably arranged on the travel base 1, and a front working mechanism 3 attached tiltably in an up-and-down direction to the revolving upperstructure 2 to perform work such as digging of earth, sand or gravel. The front working mechanism 3 is provided with a boom 4 attached tiltably in the up-and-down direction to the revolving upper structure 2, an arm 5 connected pivotally in the up-and-down direction to a free end of the boom 4, and a bucket 6 connected pivotally in the up-and-down direction to a free end of the arm 5. On the revolving upperstructure 2, an engine compartment 10, etc. are mounted.

Figure 2:
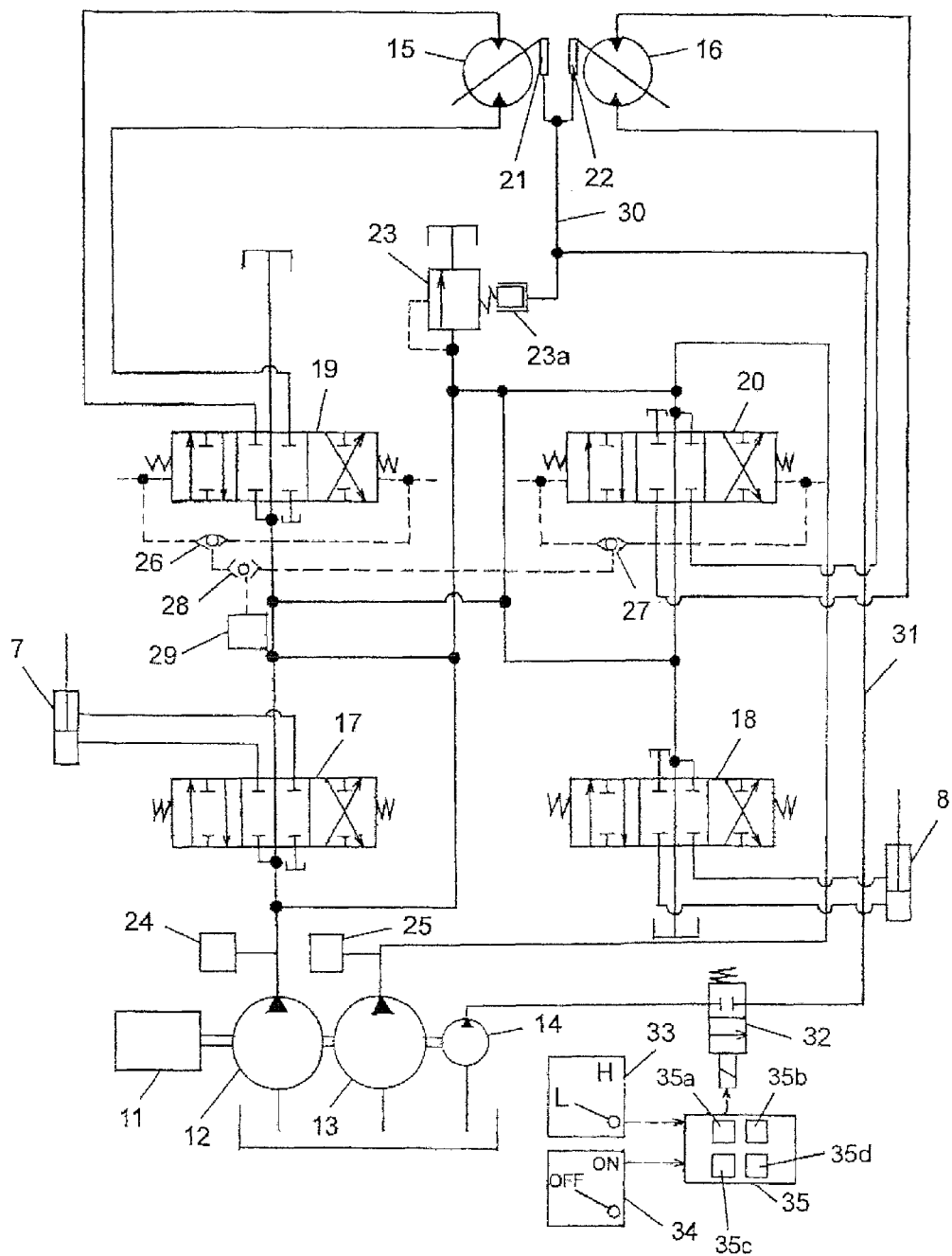
FIG. 2 is a hydraulic circuit illustrating the construction of an essential part of a hydraulic drive system with which the hydraulic excavator shown in FIG. 1 is provided.

FIG. 2 is a hydraulic circuit illustrating the construction of an essential part of a hydraulic drive system with which the hydraulic excavator shown in FIG. 1 is provided. As illustrated in FIG. 2, the hydraulic drive system is provided with an engine 11 arranged in the above-mentioned engine compartment 10, a first main pump (hydraulic pump) 12, second main pump (hydraulic pump) 13 and pilot pump (hydraulic pump) 14, all of which are driven by the engine 11, a left travel motor 15 and right travel motor 16, both of which are actuated by pressure oils delivered from the first main pump 12 and second main pump 13 to drive the above-mentioned travel base 1, and as hydraulic actuators for driving the above-mentioned front working mechanism 3, a boom cylinder 7 for driving the boom 4, an arm cylinder 8 for driving the arm 5, and a bucket cylinder 9 for driving the bucket 6 (see FIG. 1). The left travel motor 15 and right travel motor 16 are comprised of variable displacement hydraulic motors.

The hydraulic drive system is further provided with a directional control valve 17 for controlling a flow of pressure oil to be fed to the boom cylinder 7, a directional control valve 18 for controlling a flow of pressure oil to be fed to the arm cylinder 8, an unillustrated boom control device for switchingly controlling the directional control valve 17 for the boom, an unillustrated arm control device for switchingly controlling the directional control valve 18 for the arm, a left traveling directional control valve 19 for controlling a flow of pressure oil to be fed to the left travel motor 15, a right traveling directional control valve 20 for controlling a flow of pressure oil to be fed to the right travel motor 16, an unillustrated left traveling control device for switchingly controlling the left traveling directional control valve 19, and an unillustrated right traveling control device for switchingly controlling the right traveling directional control valve 20.

The hydraulic drive system is still further provided with a left traveling tilt-angle control device 21 for controlling the tilt angle of the left travel motor 15 and a right traveling tilt-angle control device 22 for controlling the tilt angle of the right travel motor 16. The hydraulic drive system is yet further provided with a hydraulically-actuated relief pressure control part, which can be changed in preset relief pressure and can selectively maintain maximum delivery pressures of the first main pump 12 and second main pump 13 at a normal-time relief pressure or a boost-time relief pressure which is a pressure higher than the normal-time relief pressure. The hydraulically-actuated relief pressure control part can be, for example, an adjustable relief valve 23.

The hydraulic drive system is yet further provided with a travel speed selector part operably arranged to selectively output an instruction signal commensurate with an instruction that selects a low speed or an instruction signal commensurate with an instruction that selects a high speed, as revolution speeds of the left travel motor 15 and right travel motor 16, and also with a traveling, hydraulic pressure oil feed part operably arranged to control, based on the instruction signal outputted from the travel speed selector part, hydraulic pressure oil to be fed to the left traveling tilt-angle control device 21 and right traveling tilt-angle control device 22.

The hydraulic drive system is even yet further provided with a boost-pressure switching selector part operably arranged to selectively output an instruction signal commensurate with an instruction that selects the normal-time relief pressure or an instruction signal commensurate with an instruction that selects the boost-time relief pressure, as the preset relief pressure of the above-mentioned adjustable relief valve 23, and also with a boosting, hydraulic pressure oil feed part operably arranged to control, based on the instruction signal outputted from the boost-pressure switching selector part, hydraulic pressure oil to be fed to a control device 23a for the adjustable relief valve 23.

By the above-mentioned left traveling tilt-angle control device 21, right traveling tilt-angle control device 22, travel speed selector part and traveling, hydraulic pressure oil feed part, there is constructed a travel speed control unit for selectively controlling the revolution speeds of the left travel motor 15 and right travel motor 16 at either the low speed or the high speed. By the above-mentioned adjustable relief valve 23, boost-pressure switching selector part and boosting, hydraulic pressure oil feed part, on the other hand, there is constructed a boost control unit for selectively controlling the preset relief pressure of the adjustable relief valve 23 at either the normal-time relief pressure or the boost-time relief pressure.

In particular, the hydraulic drive system in the first embodiment is constructed with only a single hydraulic pressure oil feed part commonly usable as the traveling, hydraulic pressure oil feed part of the above-mentioned travel speed control unit and also as the boosting, hydraulic pressure oil feed part of the above-mentioned boost control unit. This single hydraulic pressure oil feed part is provided, for example, with lines 30,31 communicating with both of the left traveling tilt-angle control device 21 and right traveling tilt-angle control device 22 of the travel speed control unit and the adjustable relief valve 23 of the boost control unit, the above-mentioned pilot pump 14 for delivering, into these lines 30,31, pilot pressure oil (hydraulic pressure oil) to be fed to the left traveling tilt-angle control device 21, right traveling tilt-angle control device 22 and adjustable relief valve 23, a solenoid valve 32 for opening or closing the line 31, and a controller 35 for controlling the solenoid valve 32.

The above-mentioned travel speed selector part is provided with a two-travel-speed selector switch 33 for selectively outputting either an instruction signal commensurate with an instruction that selects the low speed or an instruction signal commensurate with an instruction that selects the high speed, as the revolution speeds of the left travel motor 15 and right travel motor 16, a travel control performance detection part operably arranged to detect that an unillustrated traveling control device has been manipulated, and a delivery pressure detection part operably arranged to detect that delivery pressures of the first main pump 12 and second main pump 13 have reached a preset pressure set beforehand.

The above-mentioned boost-pressure switching selector part, on the other hand, is provided with a boost-pressure selector switch 34 electrically connected to the controller 35 for selectively outputting either an instruction signal commensurate with an instruction that selects the normal-time relief pressure or an instruction signal commensurate with an instruction that selects the boost-time relief pressure, as the preset relief pressure of the adjustable relief valve 23, a travel control non-performance detection part operably arranged to detect that the unillustrated traveling control device has not been manipulated, and the delivery pressure detection part operably arranged to detect that the delivery pressures of the first main pump 12 and second main pump 13 have reached the preset pressure set beforehand.

The travel control performance detection part of the above-mentioned travel speed selector part and the travel control non-performance detection part of the above-mentioned boost-pressure switching selector part are comprised of a travel-control detecting pressure sensor 29 electrically connected to the controller 35 for outputting a travel detection signal in association with a manipulation of the unillustrated traveling control device, and a travel control determination part 35a arranged in the controller 35 for determining, based on the travel detection signal outputted from the travel-control detecting pressure sensor 29, whether or not the unillustrated traveling control device has been manipulated. The above-mentioned travel-control detecting pressure sensor 29 is constructed such that a pilot pressure to be applied from the unillustrated traveling control device to control ports of the left traveling directional control valve 19 and right traveling directional control valve 20 is detected, for example, via shuttle valves 26, 27, 28 and a travel control detection signal commensurate with the pilot pressure is outputted. The pilot pressure outputted from the unillustrated traveling control device is a secondary pressure of the pilot pump 14.

The delivery pressure detection part of the above-mentioned travel speed selector part and the delivery pressure detection part of the above-mentioned boost-pressure switching selector part are comprised of a first delivery-pressure detecting pressure sensor 24 electrically connected to the controller 35 for outputting a delivery pressure detection signal commensurate with a delivery pressure of the first main pump 12, a second delivery-pressure detecting pressure sensor 25 electrically connected to the controller 35 for outputting a delivery pressure detection signal commensurate with a delivery pressure of the second main pump 13, and a boost determination part 35b arranged in the controller 35 for determining, based on the delivery pressure detection signals from the first delivery-pressure detecting pressure sensor 24 and second delivery-pressure detecting pressure sensor 25, whether or not the delivery pressures of the first main pump 12 and second main pump 13 have reached the preset pressure set beforehand, for example, the normal-time relief pressure. It is to be noted that the determination by the boost determination part 35b is performed by determining whether or not the delivery pressures of the first main pump 12 and second main pump 13 have reached a predetermined pressure lower than the normal-time relief pressure. As a pressure that may potentially reach the normal-time relief pressure, this predetermined pressure is set slightly lower than the normal-time relief pressure. The determination by the boost determination part 35b may also be performed by determining whether or not the delivery pressures of the first main pump 12 and second main pump 13 have actually reached the normal-time relief pressure.

The hydraulic drive system is still even yet further provided with a work determination part operably arranged to determine an operation of the front working mechanism 3. This work determination part is provided with an unillustrated boom control detection part (pressure sensor) for detecting a pilot pressure to be applied from the above-mentioned boom control device to a control port of the directional control valve 17 for the boom and outputting a boom control detection signal commensurate with the pilot pressure, an unillustrated arm control detection part (pressure sensor) for detecting a pilot pressure to be applied from the above-mentioned arm control device to a control port of the directional control valve 18 for the arm and outputting an arm control detection signal commensurate with the pilot pressure, a boom control determination part 35c arranged in the controller 35 for determining, based on the boom control detection signal, the state of a manipulation of the boom control device, and an arm control determination part 35d arranged in the controller 35 for determining, based on the arm control detection signal, the state of a manipulation of the arm control device. The pilot pressures outputted from the boom control device and arm control device are a secondary pressure of the pilot pump 14.

The controller 35 is provided with CPU, ROM, RAM, and an auxiliary storage to perform processing relating to the control of the hydraulic drive system, and the above-mentioned boost determination part 35b, travel control determination part 35a, boom control determination part 35c and arm control determination part 35d have been set by control programs written in the ROM and auxiliary storage. It is configured that based on the results of determinations by these boost determination part 35b, travel control determination part 35a, boom control determination part 35c and arm control determination part 35d, a control signal (electric current) is outputted to drive and control the solenoid valve 32. It is also configured that the valve position of the solenoid valve 32 can be controlled to the closed position by a control signal of current value I0 and can be controlled to the open position by a control signal of current value I1. The controller 35 is configured to perform the processing of controlling the valve position of the solenoid valve 32 to the closed position or open position based on an instruction signal from the two-travel-speed selector switch 33, an instruction signal from the boost pressure selector switch 34, a travel detection signal from the travel-control detecting pressure sensor 29, delivery pressure detection signals from both of the first delivery-pressure detecting pressure sensor 24 and second delivery-pressure detecting pressure sensor 25, a boom control detection signal from the boom control detection part, and an arm control detection signal from the arm control detection part.

Operations of the hydraulic working machine according to the first embodiment constructed as described above will next be described.

When the two-travel-speed selector switch 33 of the travel speed selector part is manipulated to a low-speed side and the traveling control device is manipulated to switchingly control the left traveling directional control valve 19 and right traveling directional control valve 20, the two-travel-speed selector switch 33 outputs an instruction signal commensurate with the low speed, the secondary pressure of the pilot pump 14 is detected by the travel-control detecting pressure sensor 29 via the shuttle valves 26,27,28, and the travel-control detecting pressure sensor 29 outputs a travel detection signal. These instruction signal and travel detection signal are inputted to the controller 35. The travel control determination part 35a of the controller 35 determines, based on the travel detection signal from the travel-control detecting pressure sensor 29, that the traveling control device is in a manipulated state, and based on the result of this determination and the instruction signal (low speed) from the two-travel-speed selector switch 33, outputs a control signal of current value I0 to the solenoid valve 32. As a consequence, the valve position of the solenoid valve 32 is controlled to the closed position so that the lines 30,32, which are in communication with both of the left traveling tilt-angle control device 21 and right traveling tilt-angle control device 22 and the control device 23a for the adjustable relief valve 23, and the pilot pump 14 are cut off from each other by the solenoid valve 32. No pilot pressure is, therefore, applied from the pilot pump 14 to the left traveling tilt-angle control device 21 and right traveling tilt-angle control device 22, so that the left traveling tilt-angle control device 21 and right traveling tilt-angle control device 22 control the tilt angles of the left travel motor 15 and right travel motor 16 at the large tilt angle commensurate with the low speed, respectively. Accordingly, the left travel motor 15 and right travel motor 16 are brought into states that they revolve at the low speed, and the travel base 1 is brought into a state that it performs a low-speed travel. As no pilot pressure is applied from the pilot pump 14 to the control device 23a for the adjustable relief valve 23 either during this time, the preset relief pressure of the adjustable relief valve 23 is controlled at the normal-time relief pressure.

When the two-travel-speed selector switch 33 is manipulated to a high-speed side and the traveling control device is manipulated to switchingly control the left traveling directional control valve 19 and right traveling directional control valve 20, on the other hand, the two-travel-speed selector switch 33 outputs an instruction signal commensurate with the high speed, the secondary pressure of the pilot pump 14 is detected by the travel-control detecting pressure sensor 29 via the shuttle valves 26,27,28, and the travel-control detecting pressure sensor 29 outputs a travel detection signal. These instruction signal and travel detection signal are inputted to the controller 35. The travel control determination part 35a of the controller 35 determines, based on the travel detection signal from the travel-control detecting pressure sensor 29, that the traveling control device is in a manipulated state, and based on the result of this determination and the instruction signal (high speed) from the two-travel-speed selector switch 33, outputs a control signal of current value I1 to the solenoid valve 32. As a consequence, the valve position of the solenoid valve 32 is controlled to the open position so that the lines 30,31, which are in communication with both of the left traveling tilt-angle control device 21 and right traveling tilt-angle control device 22 and the control device 23a for the adjustable relief valve 23, and the pilot pump 14 are communicated with each other via the solenoid valve 32. A pilot pressure is, therefore, applied from the pilot pump 14 to the left traveling tilt-angle control device 21 and right traveling tilt-angle control device 22, so that the left traveling tilt-angle control device 21 and right traveling tilt-angle control device 22 control the tilt angles of the left travel motor 15 and right travel motor 16 to the small tilt angle commensurate with the high speed, respectively. Accordingly, the left travel motor 15 and right travel motor 16 are brought into states that they revolve at the high speed, and the travel base 1 is brought into a state that it travels at the high speed. As the pilot pressure is also applied from the pilot pump 14 to the control device 23a for the adjustable relief valve 23 during this time, the preset relief pressure of the adjustable relief valve 23 is controlled to the boost-time relief pressure.

When the hydraulic working machine performs a high-speed travel without any work on a flat land in a state that the left travel motor 15 and right travel motor 16 have been controlled in a state that they revolve at the high speed (small tilt angle and boost-time relief pressure), the delivery pressures of the first main pump 12 and second main pump 13 do not reach the normal-time relief pressure, and therefore, the boost determination part 35b of the controller 35 determines, based on the delivery pressure signals from the first delivery-pressure detecting pressure sensor 24 and second delivery-pressure detecting pressure sensor 25, that the delivery pressures of the first main pump 12 and second main pump 13 have not reached the normal-time relief pressure. Then, the controller 35 continues the output of a control signal of current value I1 to the solenoid valve 32 based on this determination, and maintains the valve position of the solenoid valve 32 at the open position. Therefore, both of the left traveling tilt-angle control device 21 and right traveling tilt-angle control device 22 and the control device 23a for the adjustable relief valve 23 and the pilot pump 14 are maintained in the communicated state via the solenoid valve 32, and the left traveling tilt-angle control device 21 and right traveling tilt-angle control device 22 maintain the tilt angles of the left travel motor 15 and right travel motor 16, respectively, at the small tilt angle commensurate with the high speed. As a consequence, the revolution speeds of the left travel motor 15 and right travel motor 16 are maintained at the high speed, so that the hydraulic working machine continues the high-speed travel. As the state that the pilot pressure is applied from the pilot pump 14 to the control device 23a for the adjustable relief valve 23 is also maintained during this time, the preset relief pressure of the adjustable relief valve 23a is maintained at the boost-time relief pressure.

When the travel load becomes larger as a result of initiation of a climbing travel by the hydraulic working machine even in a state that the left travel motor 15 and right travel motor 16 likewise revolve at the high speed (the state of the small tilt angle and boost-time relief pressure), the loads on the first main pump 12 and second main pump 13 increase so that the delivery pressures of the first main pump 12 and second main pump 13 may reach the normal-time relief pressure. In this case, the boost determination part 35b of the controller 35 determines, based on the delivery pressure detection signals from the first delivery-pressure detecting pressure sensor 24 and second delivery-pressure detecting pressure sensor 25, that the delivery pressures of the first main pump 12 and second main pump 13 have reached the normal-time relief pressure. Then, the controller 35 outputs a control signal of current value I0 to the solenoid valve 32 based on this determination. As a consequence, the valve position of the solenoid valve 32 is switched from the open position to the closed position, and therefore, both of the left traveling tilt-angle control device 21 and right traveling tilt-angle control device 22 and the control device 23a for the adjustable relief valve 23 and the pilot pump 14 are cut off from each other by the solenoid valve 32. Therefore, the pilot pressure becomes no longer applied from the pilot pump 14 to the left traveling tilt-angle control device 21 and right traveling tilt-angle control device 22, and the left traveling tilt-angle control device 21 and right traveling tilt-angle control device 22 control the tilt angle of the first main pump 12 and the tilt angle of the second main pump 13, respectively, to the large tilt angle commensurate with the low speed. As a consequence, the states of the left travel motor 15 and right travel motor 16 are changed to states that they revolve at the low speed instead of the high speed. As the pilot pressure becomes no longer applied from the pilot pump 14 to the control device 23a for the adjustable relief valve 23 either during this time, the preset relief pressure of the adjustable relief valve 23 is changed from the boost-time relief pressure to the normal-time relief pressure.

In the state that the traveling control device is in a non-manipulated state, the travel control determination part 35a of the controller 35 determines, based on a travel detection signal from the travel-control detecting pressure sensor 29, that the traveling control device is in a non-manipulated state. When the delivery pressures of the first main pump 12 and second main pump 13 have not reached the normal-time relief pressure, the boost determination part 35b of the controller 35 determines, based on delivery pressure detection signals from the first delivery-pressure detecting pressure sensor 24 and second delivery-pressure detecting pressure sensor 25, that the delivery pressures of the first main pump 12 and second main pump 13 have not reached the normal-time relief pressure. If, when the results of these determinations have been obtained, the boost pressure selector switch 34 is OFF and an instruction signal that instructs the selection of the normal-time relief pressure has been outputted, the controller 35 outputs a control signal of current value I0 to the solenoid valve 32 based on the instruction signal (normal-time relief pressure) from the boost pressure selector switch 34. As a consequence, the valve position of the solenoid valve 32 is controlled to the closed position so that both of the left traveling tilt-angle control device 21 and right traveling tilt-angle control device 22 and the control device 23a for the adjustable relief valve 23 and the pilot pump 14 are cut off from each other by the solenoid valve 32. Therefore, no pilot pressure is applied from the pilot pump 14 to the control device 23a for the adjustable relief valve 23, and the preset relief pressure of the adjustable relief valve 23 is controlled at the normal-time relief pressure.

When the front working mechanism 3 is performing, for example, a boom raising operation, the boom control determination part 35c of the controller 35 determines, based on a boom control detection signal from the boom control detection part, the boom control device to be in a state of control that it is switching the directional control valve 17 for the boom to a valve position corresponding to boom raising. When the front working mechanism 3 is performing an arm crowding operation, on the other hand, the arm control determination part 35d of the controller 35 determines, based on a boom control detection signal from the arm control detection part, the arm control device to be in a state of control that it is switching the directional control valve 18 for the arm to a valve position corresponding to arm crowding. When in association with the boom raising operation or arm crowding operation, the loads on the first main pump 12 and second main pump 13 have become larger and the delivery pressures of the first main pump 12 and second main pump 13 have reached the normal-time relief pressure, the boost determination part 35b of the controller 35 determines, based on delivery pressure detection signals from the first delivery-pressure detecting pressure sensor 24 and second delivery-pressure detecting pressure sensor 25, that the delivery pressures of the first main pump 12 and second main pump 13 have reached the normal-time relief pressure. When in this state, the boost pressure selector switch 34 is maintained OFF and the preset relief pressure of the adjustable relief valve 23 is maintained at the normal-time relief pressure, the controller 35 outputs a control signal of current value I1 to the solenoid valve 32 based on the result of determination by the boom control determination part 35c that the boom control device is in a state of control that it is switching the directional control valve 17 for the boom to the valve position corresponding to boom raising or the result of determination by the arm control determination part 35d that the arm control device is in a state of control that it is switching the directional control valve 18 for the arm to the valve position corresponding to arm crowding, and the result of determination by the boost determination part 35b that the delivery pressures of the first main pump 12 and second main pump 13 have reached the normal-time relief pressure. As a consequence, the solenoid valve 32 is switched from the closed position to the open position so that the lines 30,31, which are in communication with both of the left traveling tilt-angle control device 21 and right traveling tilt-angle control device 22 and the control device 23a for the adjustable relief valve 23, and the pilot pump 14 are communicated with each other via the proportional solenoid valve 32. A pilot pressure is, therefore, applied from the pilot pump 14 to the adjustable relief valve 23, and the preset relief pressure of the adjustable relief valve 23 is changed from the normal-time relief pressure to the boost-time relief pressure. As a consequence, the boom raising operation or arm crowding operation can be performed with no difficulty.

When the travel control determination part 35a of the controller 35 determines the traveling control device to be in a non-manipulated state, the boost pressure selector switch 34 has been manipulated to ON and an instruction signal that instructs the selection of the boost-time relief pressure has been inputted to the controller 35, the controller 35 outputs a control signal of current value I1 to the solenoid valve 32 based on an instruct ion signal from the boost pressure selector switch 34. As a consequence, the valve position of the solenoid valve 32 is controlled to the open position so that both of the left traveling tilt-angle control device 21 and right traveling tilt-angle control device 22 and the control device 23a for the adjustable relief valve 23 and the pilot pump 14 are communicated with each other via the solenoid valve 32. A pilot pressure is, therefore, applied from the pilot pump 14 to the adjustable relief valve 23, and the preset relief pressure of the adjustable relief valve 23 is controlled to the boost-time relief pressure.

According to the hydraulic working machine of the first embodiment constructed as described above, the following advantageous effects can be brought about.

As the hydraulic working machine according to the first embodiment is provided with only the single hydraulic pressure oil feed part commonly usable as the traveling, hydraulic pressure oil feed part of the travel speed control unit and also as the boosting, hydraulic pressure oil feed part of the boost control unit, the number of components relevant to the traveling and boosting, hydraulic pressure oil feed part, in other words, the number of components relevant to the travel speed control unit and boost control unit can be reduced. As a consequence, the layout space relevant to the travel speed control unit and boost control unit can be reduced. Even a small hydraulic excavator or the like, which does not have enough layout space for the components relevant to the travel speed control unit and boost control unit and is prone to limitations on their layout space, it is facilitated to design the layout of the components relevant to the travel speed control unit and boost control unit. In addition, the manufacturing cost can be lowered because the number of the components relevant to the travel speed control unit and boost control unit becomes smaller.

In the hydraulic working machine according to the first embodiment, the relief pressure control part of the boost control unit is constructed with the adjustable relief valve 23. As the adjustable relief valve 23 is readily available, the hydraulic working machine according to the first embodiment is high in practical utility.

In the hydraulic working machine according to the first embodiment, even when the high speed has been selected by the two-travel-speed selector switch 33 and the hydraulic working machine is performing a high-speed travel, the travel speed is forcedly reduced to the low speed and the maximum delivery pressures of the first main pump 12 and second main pump 13 are lowered to the normal-time relief pressure when the loads on the first main pump 12 and second main pump 13 become large and the delivery pressures of these first main pump 12 and second main pump 13 reach the normal-time relief pressure. As a consequence, excellent safety can be assured upon traveling of the hydraulic working machine.

In the hydraulic working machine according to the first embodiment, even when the traveling control device is in a non-manipulated state, the normal-time relief pressure has been selected by the boost pressure selector switch 34 and the preset relief pressure of the adjustable relief valve 23 has been controlled at the normal-relief pressure, the preset relief pressure of the adjustable relief valve 23 is forcedly increased to the boost-time relief pressure when the loads on the first main pump 12 and second main pump 13 become larger and the delivery pressures of the first main pump 12 and second main pump 13 reach the normal-time relief pressure. As a consequence, excellent workability can be assured even upon performing work which is considered to result in a large load on the first main pump 12 and second main pump 13 among a variety of work to be performed by the hydraulic working machine, such as digging work performed by the hydraulic working machine.

In the hydraulic working machine according to the present invention, the controller 35 is configured to control the solenoid valve 32 such that the preset relief pressure increases to the boost-time relief pressure upon obtaining both of the result (as the result of determination by the boost determination part 35b) that the delivery pressures of the first main pump 12 and second main pump 13 have reached the normal-time relief pressure (preset pressure), and the result (as the result of determination by the boom determination part 35b) that the boom control device is in a manipulated state that it is switching the directional control valve 17 for the boom to the valve position corresponding to boom raising or the result (as the result of determination by the arm control determination part 35d) that the arm control device is in a manipulated state that it is switching the directional control valve 18 for the arm to the valve position corresponding to arm crowding, in a state that the preset relief pressure has been controlled at the normal-time relief pressure and that as the result of determination by the travel control determination part 35a, the result that the left traveling control device and right traveling control device are in a non-manipulated state has been obtained. It is, therefore, configured that the preset relief pressure is increased to the boost-time relief pressure only when the front working mechanism 3 performs a specific operation including at least one of boom raising and arm crowding. The present invention is, however, not limited to such a hydraulic working machine that control to increase the preset relief valve to the boost-time relief pressure is performed only when the front working mechanism 3 performs a specific operation as described above. It may also be configured to control the solenoid valve 32 such that the preset relief pressure always increases to the boost-time relief pressure upon obtaining, as the result of determination by the boost determination part 35b, the result that the delivery pressures of the first main pump 12 and second main pump 13 have reached the normal-time relief pressure (preset pressure) in a state that the result (as the result of determination by the travel control determination part 35a) that the left traveling control device and right traveling control device are in a non-manipulated state has been obtained.

It is configured that, by controlling the valve position of the solenoid valve 32 to the open position to communicate both of the left traveling tilt-angle control device 21 and right traveling tilt-angle control device 22 and the control device 23a for the adjustable relief valve 23 and the pilot pump 14 with each other, a pilot pressure is fed to the left traveling tilt-angle control device 21, the right traveling tilt-angle control device 22 and the control device 23a for the adjustable relief valve 23, the tilt angles of the left travel motor 15 and right travel motor 16 are controlled to the small tilt angle, and the adjustable relief valve 23 is controlled to the boost-time relief pressure. It is also configured that, by controlling the valve position of the solenoid valve 32 to the closed position to cut off both of the left traveling tilt-angle control device 21 and right traveling tilt-angle control device 22 and the control device 23a for the adjustable relief valve 23 and the pilot pump 14 from each other, no pilot pressure is fed to the left traveling tilt-angle control device 21, the right traveling tilt-angle control device 22 and the control device 23a for the adjustable relief valve 23, the tilt angles of the left travel motor 15 and right travel motor 16 are controlled at the large tilt angle, and the adjustable relief valve 23 is controlled at the normal-time relief pressure. It may, however, be configured such that by feeding a pilot pressure to the left traveling tilt-angle control device 21, the right traveling tilt-angle control device 22 and the control device 23a for the adjustable relief valve 23, the tilt angles of the left travel motor 15 and right travel motor 16 are controlled to the large tilt angle and the adjustable relief valve 23 is controlled to the normal-time relief pressure, and that by feeding no pilot pressure to the left traveling tilt-angle control device 21, the right traveling tilt-angle control device 22 and the control device 23a for the adjustable relief valve 23, the tilt angles of the left travel motor 15 and right travel motor 16 are controlled at the small tilt angle and the adjustable relief valve 23 is controlled at the boost-time relief pressure.

Second Embodiment

A hydraulic working machine according to a second embodiment of the present invention will be described with reference to FIG. 3 through FIG. 7.

Figure 3:
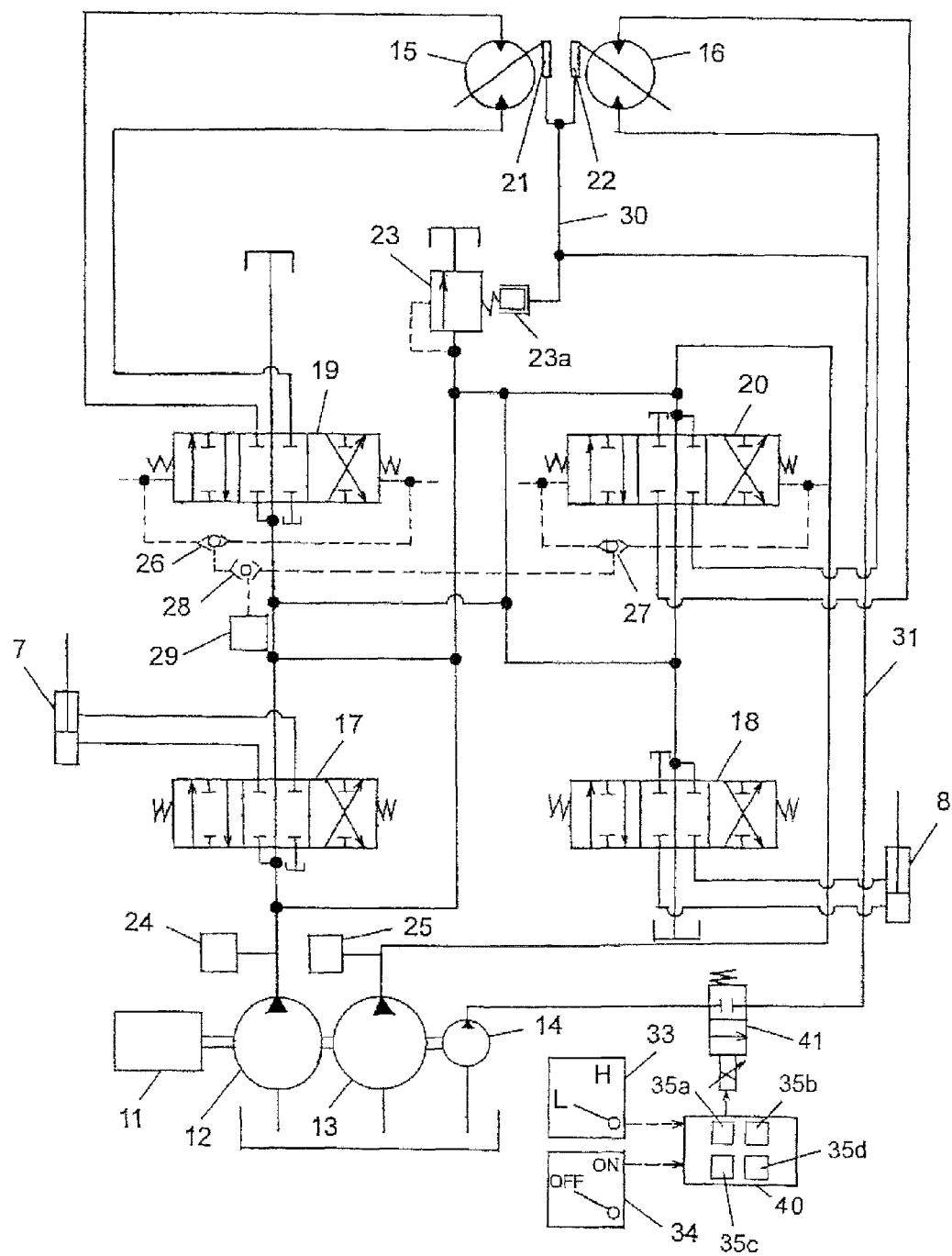
FIG. 3 is a hydraulic circuit illustrating the construction of an essential part of a hydraulic drive system with which a hydraulic working machine according to a second embodiment of the present invention is provided.

FIG. 3 is a hydraulic circuit illustrating the construction of an essential part of a hydraulic drive system with which a hydraulic working machine according to a second embodiment of the present invention is provided. As illustrated in FIG. 3, the hydraulic drive system in the second embodiment is provided with a proportional solenoid valve 41 and controller 40 in place of the solenoid valve 32 and controller 35 in the first embodiment. The construction of the hydraulic drive system in the second embodiment other than these proportional solenoid valve 41 and controller 40 is the same as that of the hydraulic drive system in the first embodiment.

Figure 4:
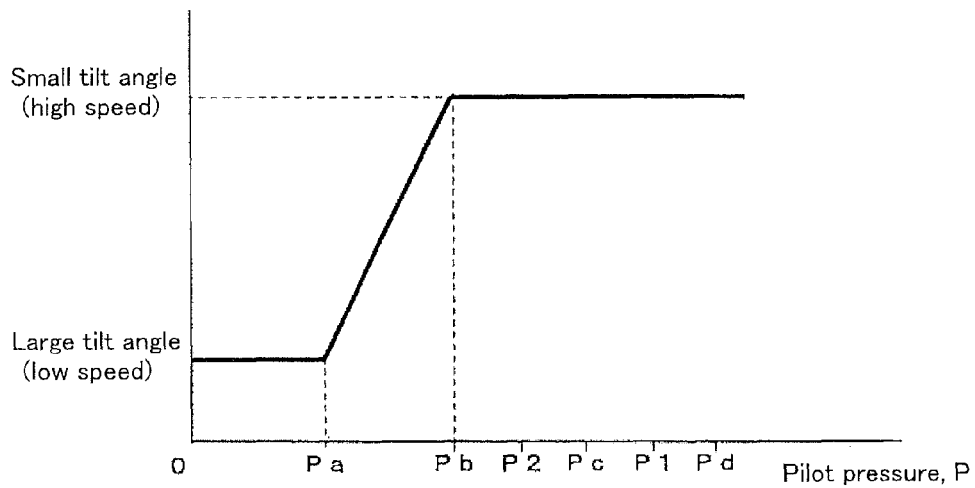
FIG. 4 is a diagram depicting characteristics of a tilt-angle control device for a travel motor.

FIG. 4 is a diagram depicting characteristics of a tilt-angle control device for a travel motor. The left travelling tilt-angle control device 21 and right traveling tilt-angle control device 22 have the characteristics depicted in FIG. 4. Described specifically, the tilt angles of the left travel motor 15 and right travel motor 16 are controlled to the large tilt angle commensurate with the low speed in a state that a pilot pressure P to be applied to the left travelling tilt-angle control device 21 and right traveling tilt-angle control device 22 is equal to or lower than Pa (P≦Pa). The tilt angles of the left travel motor 15 and right travel motor 16 are, however, controlled to the small tilt angle commensurate with the high speed in a state that the pilot pressure P is equal to or higher than Pb (Pb≦P, Pb>Pa).

Figure 5:
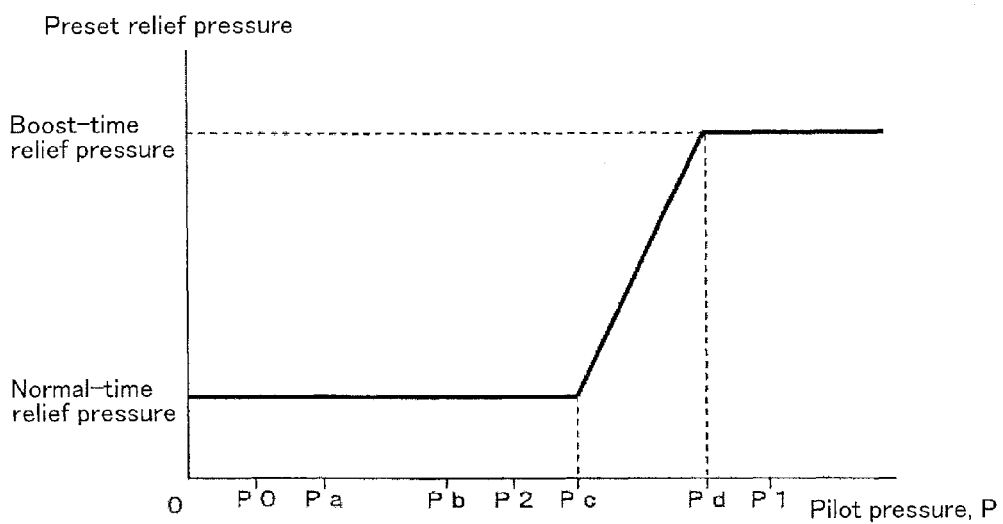
FIG. 5 is a diagram illustrating characteristics of an adjustable relief valve shown in FIG. 3.

FIG. 5 is a diagram illustrating characteristics of an adjustable relief valve shown in FIG. 3. As illustrated in FIG. 5, the preset relief valve of the adjustable relief valve 23, in other words, the maximum delivery pressures of the first main pump 12 and second main pump 13 are regulated to the normal-time relief pressure in a state that the pilot pressure P to be applied to the control device 23a for the adjustable relief valve 23 is equal to or lower than Pc (P≦Pc, Pb<Pc), but regulated to the boost-time relief pressure in a state that the pilot pressure P is equal to or higher than Pd (Pd≦P).

Figure 6:
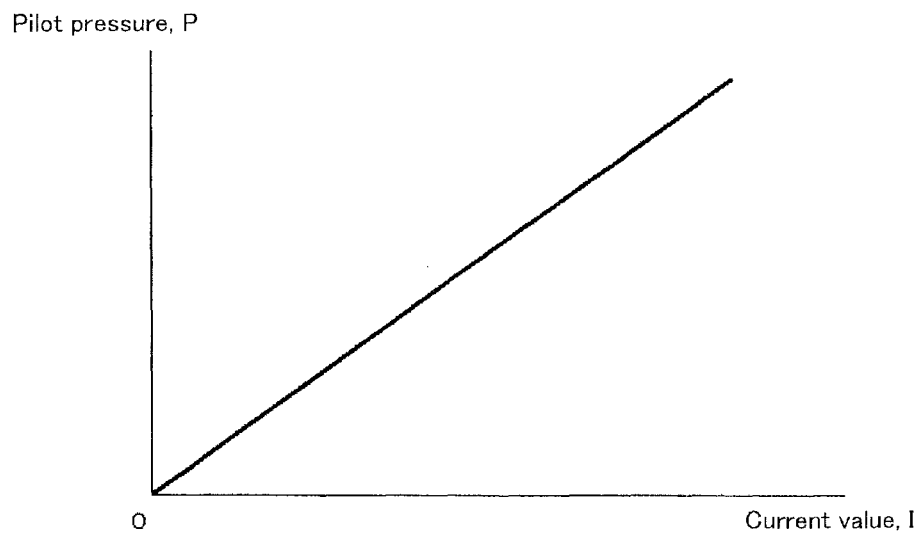
FIG. 6 is a diagram depicting output characteristics of a proportional solenoid valve shown in FIG. 3.

FIG. 6 is a diagram depicting output characteristics of the proportional solenoid valve shown in FIG. 3. The proportional solenoid valve 41 outputs a pilot pressure P which is proportional to the current value of a control signal.

Figure 7:
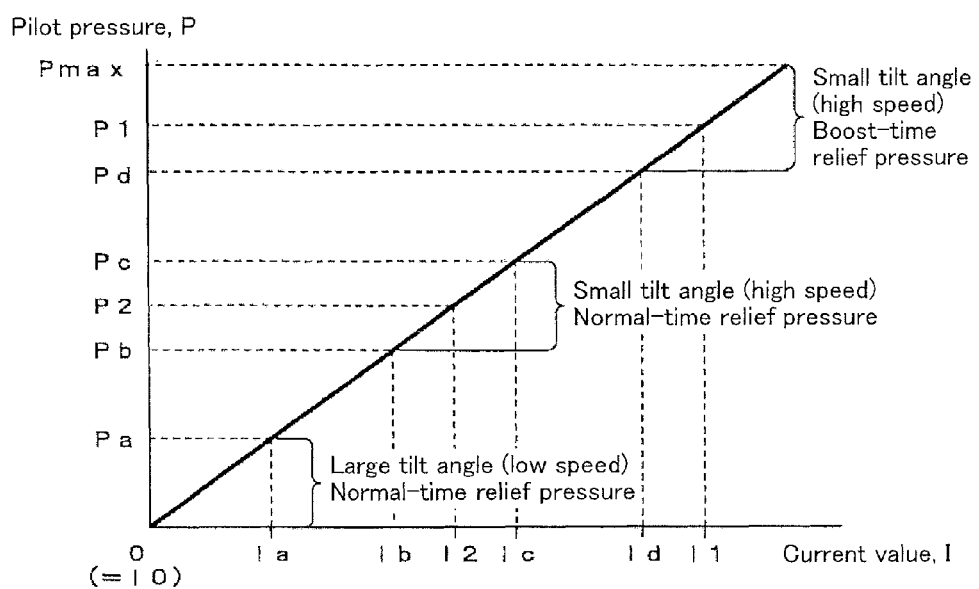
FIG. 7 is a diagram illustrating a relationship among pilot pressures outputted from the proportional solenoid valve, tilt angles of the travel motor, and preset relief pressures of the adjustable relief valve (maximum delivery pressures of a main pump).

FIG. 7 is a diagram illustrating a relationship among pilot pressures outputted from the proportional solenoid valve, tilt angles of the travel motor, and preset relief pressures of the adjustable relief valve (maximum delivery pressures of a main pump). As illustrated in FIG. 7, it is configured that, when the range of the pilot pressure P is "0≦P<Pa", the tilt angles of the left travel motor 15 and right travel motor 16 are controlled to the large tilt angle (low speed) and the adjustable relief valve 23 is controlled to the normal-time relief pressure. The range "0≦P<Pa" of the pilot pressure P corresponds to the range "0≦I<Ia" of the current value I of the control signal outputted from the controller 40. It is also configured that, when the range of the pilot pressure P is "Pb≦P<Pc, Pa<Pb", the tilt angles of the left travel motor 15 and right travel motor 16 are controlled to the small tilt angle (high speed) and the adjustable relief valve 23 is controlled to the normal-time relief pressure. The range "Pb≦P<Pc" of the pilot pressure P corresponds to the range "Ib≦I<Ic" of the current value I of the control signal outputted from the controller 40. It is also configured that, when the range of the pilot pressure P is "Pd≦P, Pc<Pd", the tilt angles of the left travel motor 15 and right travel motor 16 are controlled to the small tilt angle (high speed) and the adjustable relief valve 23 is controlled to the boost-time relief pressure. The range "Pd≦P" of the pilot pressure P corresponds to the range "Id≦I" of the current value I of the control signal outputted from the controller 40. The controller 40 is configured such that it selects, as the current value of the control signal, one of I0 (for example, I0=0) in the above-mentioned range "0≦I<Ia" of the current value I, I1 in "Id≦I" and I2 in "Ib≦I<Ic" based on the results of determinations by the boost determination part 35b, travel control determination part 35a, boom control determination part 35c and arm control determination part 35d, and controls the valve position of the proportional solenoid valve 41 to the closed position, the open position or an intermediate valve position between these closed position and open position. The term "intermediate valve position" part a valve position between the closed position and the open position, where the pilot pressure P2 is outputted, and does not include any significance as to whether or not the displacement of a valve element from the intermediate valve position to the closed position and the displacement from the intermediate valve position to the open position are identical to each other. The current values I0,I1 of the control signal in the first embodiment are equal to the current values I0,I1 of the control signal in the second embodiment. The second embodiment is characterized in that the proportional solenoid valve 41 can be controlled by the control signal of current value I2 in addition to the control signals of current values I0,I1.

The controller 40 in the second embodiment is configured such that, upon obtaining the result of determination by the travel control determination part 35a that the traveling control device is in a manipulated state and the result of determination by the boost determination part 35b that the delivery pressures of the first main pump 12 and second main pump 13 have not reached the normal-time relief pressure in a state that the selection of the high speed has been instructed by the two-travel-speed selector switch 33, the preset relief pressure is controlled to the normal-time relief pressure, and the proportional solenoid valve 41 is controlled with the current value I of the control signal being set at "I=I2" such that the tilt angles of the left travel motor 15 and right travel motor 16 are changed to the small tilt angle commensurate with the high speed.

Operations of the hydraulic working machine according to the second embodiment constructed as described above will be described next.

When the two-travel-speed selector switch 33 of the travel speed selector part is manipulated to the low-speed side and the traveling control device is manipulated to switchingly control the left traveling directional control valve 19 and right traveling directional control valve 20, the two-travel-speed selector switch 33 outputs an instruction signal commensurate with the low speed, the secondary pressure of the pilot pump 14 is detected by the travel-control detecting pressure sensor 29 via the shuttle valves 26,27,28, and the travel-control detecting pressure sensor 29 outputs a travel detection signal. These instruction signal and travel detection signal are inputted to the controller 40. The travel control determination part 35a of the controller 40 determines, based on the travel detection signal from the travel-control detecting pressure sensor 29, that the traveling control device is in a manipulated state, and based on the result of this determination and the instruction signal (low speed) from the two-travel-speed selector switch 33, changes the setting of the current value I of the control signal to I=0, and outputs the control signal to the proportional solenoid valve 41. As a consequence, the valve position of the proportional solenoid valve 41 is controlled to the closed position so that both of the left traveling tilt-angle control device 21 and right traveling tilt-angle control device 22 and the control device 23a for the adjustable relief valve 23 and the pilot pump 14 are cut off from each other by the proportional solenoid valve 41. No pilot pressure is, therefore, applied from the pilot pump 14 to the left traveling tilt-angle control device 21 and right traveling tilt-angle control device 22 (P=0, see FIG. 7), so that the left traveling tilt-angle control device 21 and right traveling tilt-angle control device 22 control the tilt angles of the left travel motor 15 and right travel motor 16 at the large tilt angle commensurate with the low speed, respectively. Accordingly, the left travel motor 15 and right travel motor 16 are brought into state they revolve at the low speed, and the travel base 1 is brought into a state that it travels at the low speed. As no pilot pressure is applied for the setting of the boost-time relief pressure either from the pilot pump 14 to the control device 23a for the adjustable relief valve 23 during this time, the preset relief pressure of the adjustable relief valve 23 is controlled at the normal-time relief pressure.

When the two-travel-speed selector switch 33 is manipulated to the high-speed side and the traveling control device is manipulated to switchingly control the left traveling directional control valve 19 and right traveling directional control valve 20, on the other hand, the two-travel-speed selector switch 33 outputs an instruction signal commensurate with the high speed, the secondary pressure of the pilot pump 14 is detected by the travel-control detecting pressure sensor 29 via the shuttle valves 26,27,28, and the travel-control detecting pressure sensor 29 outputs a travel detection signal. These instruction signal and travel detection signal are inputted to the controller 40. The travel control determination part 35a of the controller 40 determines, based on the travel detection signal from the travel-control detecting pressure sensor 29, that the traveling control device is in a manipulated state. During this time, the boost determination part 35b of the controller 40 determines whether or not the delivery pressures of the first main pump 12 and second main pump 13 have reached the normal-time relief pressure. When upon making this determination, the hydraulic working machine is traveling on a flat land without performing work that requires to swing the revolving upperstructure 2 or to operate the front working mechanism 3, the delivery pressures of the first main pump 12 and second main pump 13 do not reach the normal-time relief pressure, and therefore, the boost determination part 35b of the controller 40 determines, based on the delivery pressure signals from the first delivery-pressure detecting pressure sensor 24 and second delivery-pressure detecting pressure sensor 25, that the delivery pressures of the first main pump 12 and second main pump 13 have not reached the normal-time relief pressure. In the state that the selection of the high speed has been instructed by the two-travel-speed selector switch 33, the controller 40 hence obtains the result of determination by the travel control determination part 35a that the traveling control device is in a manipulated state and the result of determination by the boost determination part 35b that the delivery pressures of the first main pump 12 and second main pump 13 have not reached the normal-time relief pressure. Based on the results of these two determinations, the controller 40 then outputs a control signal of current value I2 to the proportional solenoid valve 41. As a result, the valve position of the proportional solenoid valve 41 is controlled to the intermediate valve position where the pilot pressure P2 is outputted. Therefore, the state that both of the left traveling tilt-angle control device 21 and right traveling tilt-angle control device 22 and the control device 23a for the adjustable relief valve 23 and the pilot pump 14 are communicated with each other via the proportional solenoid valve 41 is maintained, and the pilot pressure P2 is applied from the pilot pump 14 to the left traveling tilt-angle control device 21 and right traveling tilt-angle control device 22 via the proportional solenoid valve 41. As a consequence, the tilt angles of the left travel motor 15 and right travel motor 16 are maintained at the small tilt angle commensurate with the high speed. In other words, the revolution speeds of the left travel motor 15 and right travel motor 16 are maintained at the high speed, so that the hydraulic working machine continues the high-speed travel. The pilot pressure P2 is also applied from the pilot pump 14 to the control device 23a for the adjustable relief valve 23. As this pilot pressure P2 is lower than the pilot pressure Pc, the preset relief pressure of the adjustable relief valve 23a, however, does not increase to the boost-time relief pressure, but is maintained at the normal-time relief pressure (see FIG. 5).

If the hydraulic working machine initiates a climbing travel in this state, the travel load becomes larger. In association with this, the loads on the first main pump 12 and second main pump 13 increase so that the delivery pressures of the first main pump 12 and second main pump 13 may reach the normal-time relief pressure. In this case, the boost determination part 35b of the controller 40 determines, based on the delivery pressure detection signals from the first delivery-pressure detecting pressure sensor 24 and second delivery-pressure detecting pressure sensor 25, that the delivery pressures of the first main pump 12 and second main pump 13 have reached the normal-time relief pressure. This determination is equivalent to the determination that the tilt angles of the left travel motor 15 and right travel motor 16 have been controlled to the small tilt angle commensurate with the high speed and also that, in the state that the preset relief pressure of the adjustable relief valve 23a has been set at the normal-time relief pressure, the travel drive power becomes insufficient while the hydraulic working machine is climbing. When the result of this determination is obtained, the controller 40 changes the setting of the current value I of the control signal from "I=I2" to "I=0", and no longer outputs any control signal to the proportional solenoid valve 41. As a consequence, the valve position of the proportional solenoid valve 41 is switched from the intermediate valve position to the closed position, and the lines 30,31, which are in communication with both of the left traveling tilt-angle control device 21 and right traveling tilt-angle control device 22 and the control device 23a for the adjustable relief valve 23, and the pilot pump 14 are cut off from each other by the proportional solenoid valve 41. Therefore, the pilot pressure becomes no longer applied from the pilot pump 14 to the left traveling tilt-angle control device 21 and right traveling tilt-angle control device 22, and the left traveling tilt-angle control device 21 and right traveling tilt-angle control device 22 control the tilt angles of the left travel motor 15 and right travel motor 16 to the large tilt angle commensurate with the low speed, respectively. As a consequence, the states of the left travel motor 15 and right travel motor 16 are changed to states that they revolve at the low speed instead of the high speed. Although the pilot pressure to be applied from the pilot pump 14 to the control device 23a for the adjustable relief valve 23 changes from P2 to 0 during this time, this change is a change in the range of the pilot pressure P lower than Pc so that the preset relief pressure of the adjustable relief valve 23 is maintained at the normal-time relief pressure.

In the state that the traveling control device is in a non-manipulated state, the travel control determination part 35a of the controller 40 determines, based on a travel detection signal from the travel-control detecting pressure sensor 29, that the traveling control device is in a non-manipulated state. When the delivery pressures of the first main pump 12 and second main pump 13 have not reached the normal-time relief pressure, the boost determination part 35b of the controller 40 determines, based on the delivery pressure detection signals from the first delivery-pressure detecting pressure sensor 24 and second delivery-pressure detecting pressure sensor 25, that the delivery pressures of the first main pump 12 and second main pump 13 have not reached the normal-time relief pressure. If, when the results of these determinations have been obtained, the boost pressure selector switch 34 is OFF and an instruction signal that instructs the selection of the normal-time relief pressure has been outputted, the controller 40 changes the setting of the current value I of the control signal to "I=0" based on the instruction signal from the boost pressure selector switch 34, and does not output the control signal to the proportional solenoid valve 41. As a consequence, the valve position of the proportional solenoid valve 32 is controlled to the closed position so that both of the left traveling tilt-angle control device 21 and right traveling tilt-angle control device 22 and the control device 23a for the adjustable relief valve 23 and the pilot pump 14 are cut off from each other by the proportional solenoid valve 41. Therefore, the pilot pressure P is not applied from the pilot pump 14 to the control device 23a for the adjustable relief valve 23, and the preset relief pressure of the adjustable relief valve 23 is controlled at the normal-time relief pressure.

When the front working mechanism 3 is performing, for example, a boom raising operation, the boom control determination part 35c of the controller 40 determines, based on a boom control detection signal from the boom control detection part, the boom control device to be in a state of control that it is switching the directional control valve 17 for the boom to the valve position corresponding to boom raising. When the front working mechanism 3 is performing an arm crowding operation, on the other hand, the arm control determination part 35d of the controller 40 determines, based on a boom control detection signal from the arm control detection part, the arm control device to be in a state of control that it is switching the directional control valve 18 for the arm to the valve position corresponding to arm crowding. When in association with the boom raising operation or arm crowding operation, the loads on the first main pump 12 and second main pump 13 have become larger and the delivery pressures of the first main pump 12 and second main pump 13 have reached the normal-time relief pressure, the boost determination part 35b of the controller 40 determines, based on delivery pressure detection signals from the first delivery-pressure detecting pressure sensor 24 and second delivery-pressure detecting pressure sensor 25, that the delivery pressures of the first main pump 12 and second main pump 13 have reached the normal-time relief pressure. If, when the result of this determination has been obtained, an instruction signal that instructs the selection of the normal-time relief pressure has been inputted from the boost pressure selector switch 34 to the controller 40, the controller 40 changes the setting of the current value I of the control signal to "I=I1" based on the result of determination by the boom control determination part 35c that the boom control device is in a state of control that it is switching the directional control valve 17 for the boom to the valve position corresponding to boom raising or the result of determination by the arm control determination part 35d that the arm control device is in a state of control that it is switching the directional control valve 18 for the arm to the valve position corresponding to arm crowding, and the result of determination by the boost determination part 35b that the delivery pressures of the first main pump 12 and second main pump 13 have reached the normal-time relief pressure, and outputs the control signal to the proportional solenoid valve 41. As a consequence, the proportional solenoid valve 41 is switched from the closed position to the open position so that both of the left traveling tilt-angle control device 21 and right traveling tilt-angle control device 22 and the control device 23a for the adjustable relief valve 23 and the pilot pump 14 are communicated with each other via the proportional solenoid valve 41. The pilot pressure P1 is, therefore, applied from the proportional solenoid valve 41 to the adjustable relief valve 23, and the preset relief pressure of the adjustable relief valve 23 is changed from the normal-time relief pressure to the boost-time relief pressure. As a consequence, the boom raising operation or arm crowding operation can be performed with no difficulty.

When the travel control determination part 35a of the controller 40 determines the traveling control device to be in a non-manipulated state, the boost pressure selector switch 34 has been manipulated to ON, and an instruction signal that instructs the selection of the boost-time relief pressure has been inputted to the controller 40, the controller 40 changes the setting of the current value I of the control signal to "I=I1" based on the instruction signal from the boost pressure selector switch 34, and outputs the control signal to the proportional solenoid valve 32. As a consequence, the valve position of the proportional solenoid valve 41 is controlled to the open position so that both of the left traveling tilt-angle control device 21 and right traveling tilt-angle control device 22 and the adjustable relief valve 23 and the pilot pump 14 are communicated with each other via the proportional solenoid valve 41. The pilot pressure P1 is, therefore, applied from the proportional solenoid valve 41 to the adjustable relief valve 23, and the preset relief pressure of the adjustable relief valve 23 is controlled to the boost-time relief pressure.

According to the hydraulic working machine of the second embodiment, the following advantageous effects can be brought about.

As the hydraulic working machine according to the second embodiment is provided with only the single hydraulic pressure oil feed part commonly usable as the traveling, hydraulic pressure oil feed part of the travel speed control unit and also as the boosting, hydraulic pressure oil feed part of the boost control unit, the number of components relevant to the traveling and boosting, hydraulic pressure oil feed part, in other words, the number of components relevant to the travel speed control unit and boost control unit can be reduced. As a consequence, the layout space relevant to the travel speed control unit and boost control unit can be reduced. Even in a small hydraulic excavator or the like, which does not have enough layout space for the components relevant to the travel speed control unit and boost control unit and is prone to limitations on their layout space, it is facilitated to design the layout of the components relevant to the travel speed control unit and boost control unit. In addition, the manufacturing cost can be lowered because the number of the components relevant to the travel speed control unit and boost control unit becomes smaller.

In the hydraulic working machine according to the second embodiment, the relief pressure control part of the boost control unit is constructed with the adjustable relief valve 23 as in the hydraulic working machine according to the first embodiment. As the adjustable relief valve 23 is readily available, the hydraulic working machine according to the second embodiment is high in practical utility.

In the hydraulic working machine according to the second embodiment, even when the traveling control device is in a non-manipulated state, the normal-time relief pressure has been selected by the boost pressure selector switch 34 and the preset relief pressure of the adjustable relief valve 23 has been controlled at the normal-relief pressure, the preset relief pressure of the adjustable relief valve 23 is forcedly increased to the boost-time relief pressure as in the hydraulic working machine according to the first embodiment when the loads on the first main pump 12 and second main pump 13 become larger and the delivery pressures of the first main pump 12 and second main pump 13 reach the normal-time relief pressure. As a consequence, excellent workability can be assured even upon performing work which results in a large load on the first main pump 12 and second main pump 13 among a variety of work to be performed by the hydraulic working machine, such as digging work performed by the hydraulic working machine.

In the hydraulic working machine according to the second embodiment, even when the high speed has been selected by the two-travel-speed selector switch 33 and the hydraulic working machine is performing a high-speed travel, the travel speed is forcedly reduced to the low speed and the maximum delivery pressures of the first main pump 12 and second main pump 13 are lowered to the normal-time relief pressure, as in the hydraulic working machine according to the first embodiment, when the loads on the first main pump 12 and second main pump 13 become larger and the delivery pressures of these first main pump 12 and second main pump 13 reach the normal-time relief pressure. As a consequence, excellent safety can be assured upon traveling of the hydraulic working machine.

In particular, if the delivery pressures of the first main pump 12 and second main pump 13 have not reached the normal-time relief pressure when the high speed has been selected by the two-travel-speed switch 33 and a high-speed travel is being performed, the hydraulic working machine according to the second embodiment, different from the hydraulic working machine according to the first embodiment, can control the maximum delivery pressures of the first main pump 12 and second main pump 13 to the normal-time relief pressure while maintaining the tilt angles of the left travel motor 15 and right travel motor 16 at the small tilt angle commensurate with the high speed. As a consequence, improved safety is available upon performing a high-speed travel.

LEGEND

1 Travel base
3 Front working mechanism (working mechanism)
11 Engine
12 First main pump
13 Second main pump
14 Pilot pump (hydraulic pressure oil feed part)
15 Left travel motor
16 Right travel motor
19 Left traveling directional control valve
20 Right traveling directional control valve
21 Left traveling tilt-angle control device
22 Right traveling tilt-angle control device
23 Adjustable relief valve (relief pressure control part)
23a Control device
24 First delivery-pressure detecting pressure sensor (delivery pressure detection part) [travel speed selector part] [boost-pressure switching selector part]
25 Second delivery-pressure detecting pressure sensor (delivery pressure detection part) [travel speed selector part] [boost-pressure switching selector part]
26 Shuttle valve (travel control performance detection part) (travel control non-performance detection part)
27 Shuttle valve (travel control performance detection part) (travel control non-performance detection part)
28 Shuttle valve (travel control performance detection part) (travel control non-performance detection part)
29 Travel-control detecting pressure sensor (travel control performance detection part) (travel control non-performance detection part)
30 Line (hydraulic pressure oil feed part)
31 Line (hydraulic pressure oil feed part)
32 Solenoid valve (hydraulic pressure oil feed part)
33 Two-travel-speed selector switch (travel speed selector part)
34 Boost pressure selector switch (boost-pressure switching selector part)
35 Controller (hydraulic pressure oil feed part)
35a Travel control determination part
35b Boost determination part
35c Boom control determination part
35d Arm control determination part
40 Controller
41 Proportional solenoid valve

The invention claimed is:

1. A hydraulic working machine provided with a hydraulic pump as a main pump, a variable displacement hydraulic motor actuated as a travel motor by pressure oil delivered from the main pump to allow a travel base to travel, a traveling directional control valve for controlling a flow of pressure oil to be fed from the main pump to the travel motor, a traveling control device for switchingly controlling the traveling directional control valve, a travel speed control unit for controlling a tilt angle of the travel motor in such a state that the travel motor revolves at one of two speeds consisting of a low speed and a high speed, and a boost control unit for controlling a maximum delivery pressure of the main pump, said travel speed control unit being provided with a hydraulically-actuated, traveling tilt-angle control device for controlling the tilt angle of the travel motor, a travel speed selector part operably arranged to instruct selection of one of the low speed and high speed, and a traveling, hydraulic pressure oil feed part operably arranged to control hydraulic pressure oil, which is to be fed to the traveling tilt-angle control device, based on an instruction from the travel speed selector part, and said boost control unit being provided with a hydraulically-actuated, relief pressure control part operably arranged to control a preset relief pressure at which the maximum delivery pressure of the main pump is to be regulated, a boost-pressure switching selector part operably arranged to instruct to select, as the preset relief pressure of the relief pressure control part, one of a normal-time relief pressure and a boost-time relief pressure which is a pressure higher than the normal-time relief pressure, and a boosting, hydraulic pressure oil feed part operably arranged to control hydraulic pressure oil, which is to be fed to the relief pressure control part, based on an instruction from the boost-pressure switching selector part, characterized in that:

the hydraulic working machine is provided with only a single hydraulic pressure oil feed part commonly usable as the traveling, hydraulic pressure oil feed part of the travel speed control unit and also as the boosting, hydraulic pressure oil feed part of the boost control unit.

2. The hydraulic working machine according to claim 1, wherein the relief pressure control part of the boost control unit comprises an adjustable relief valve.

3. The hydraulic working machine according to claim 2, wherein:

the single hydraulic pressure oil feed part is provided with a line communicating with both of the traveling tilt-angle control device of the travel speed control unit and the adjustable relief valve of the boost control unit, a solenoid valve for opening or closing the line, a pilot pump for delivering, into the line, pilot pressure oil as the hydraulic pressure oils that are to drive the traveling, tilt-angle control device and adjustable relief valve, and a controller for controlling the solenoid valve, and the controller controls the solenoid valve such that responsive to an instruction from the travel speed selector part of the travel speed control unit, the travel motor is brought into a state of revolution at the low speed or a state of revolution at the high speed, or such that responsive to an instruction from the boost-pressure switching selector part of the boost control unit, the preset relief pressure of the adjustable relief valve is set at the normal-time relief pressure or boost-time relief pressure.

4. The hydraulic working machine according to claim 3, wherein:

the travel speed selector part is provided with a two-travel-speed selector switch electrically connected to the controller for instructing selection of one of the low speed and high speed as a revolution speed of the travel motor, a travel control performance detection part operably arranged to detect a manipulation of the traveling control device, and a delivery pressure detection part operably arranged to detect that a delivery pressure of the main pump has reached the preset pressure set beforehand, the boost-pressure switching selector part is provided with a boost pressure selector switch electrically connected to the controller for instructing selection of one of the normal-time relief pressure and boost-time relief pressure as the preset relief pressure of the adjustable relief valve, a travel control non-performance detection part operably arranged to detect a non-manipulation of the traveling control device, and a delivery pressure detection part operably arranged to detect that the delivery pressure of the main pump has reached the preset pressure set beforehand, the travel control performance detection part of the travel speed selector part and the travel control non-performance detection part of the boost-pressure switching selector part are provided with a travel-control detecting pressure sensor for outputting a travel detection signal in association with a manipulation of the traveling control device, and also with a travel control determination part arranged in the controller for determining, based on the travel detection signal, whether or not the traveling control device has been manipulated, the delivery pressure detection part of the travel speed selector part and the delivery pressure detection part of the boost-pressure switching selector part are provided with a delivery-pressure detecting pressure sensor for outputting a delivery pressure detection signal commensurate with the delivery pressure of the main pump, and also with a boost determination part arranged in the controller for determining, based on the delivery pressure detection signal, whether or not the delivery pressure of the main pump has reached the preset pressure, and when the delivery pressure of the main pump is determined by the boost determination part to have reached the preset pressure in a state that the tilt angle of the travel motor has been controlled to a small tilt angle commensurate with the high speed and the traveling control device is determined by the travel control determination part to be in a manipulated state, the controller controls the solenoid valve such that the tilt angle of the travel motor becomes a large tilt angle commensurate with the low speed, and when the delivery pressure of the main pump is determined by the boost determination part to have reached the preset pressure in a state that the preset relief pressure has been controlled at the normal-time relief pressure and the traveling control device is determined by the travel control determination part not to be in the manipulated state, the controller controls the solenoid valve such that the preset relief pressure increases to the boost-time relief pressure.

5. The hydraulic working machine according to claim 4, wherein:

the solenoid valve comprises a proportional solenoid valve, and based on a result of determination by the travel control determination part that the traveling control device is in the manipulated state under a state that the selection of the high speed has been instructed by the two-travel-speed selector switch and a result of determination by the boost determination part that the delivery pressure of the main pump has not reached the predetermined pressure, the controller controls the proportional solenoid valve such that the tilt angle of the travel motor is controlled to the small tilt angle commensurate with the high speed and the preset relief pressure is controlled to the normal-time relief pressure.

* * * * *